United States Patent [19]

Kämpf

[11] Patent Number: 4,540,386
[45] Date of Patent: Sep. 10, 1985

[54] AXIAL SECURING DEVICE FOR UNIVERSAL JOINT ASSEMBLY

[75] Inventor: Klaus Kämpf, Lohmar, Fed. Rep. of Germany

[73] Assignee: Jean Walterscheid GmbH, Lohmar, Fed. Rep. of Germany

[21] Appl. No.: 579,660

[22] Filed: Feb. 13, 1984

[30] Foreign Application Priority Data

Feb. 19, 1983 [DE] Fed. Rep. of Germany ....... 3305789

[51] Int. Cl.$^3$ .............................................. F16D 3/26
[52] U.S. Cl. ................................................. 464/130
[58] Field of Search ................................. 464/128-131

[56] References Cited

U.S. PATENT DOCUMENTS

| | | | |
|---|---|---|---|
| 3,062,026 | 11/1962 | Pitner | 464/130 |
| 3,937,035 | 2/1976 | Fisher et al. | 464/130 |
| 4,000,628 | 1/1977 | Funatani et al. | 464/130 |
| 4,221,119 | 9/1980 | Mangiavacchi | 464/130 |

Primary Examiner—John Petrakes
Attorney, Agent, or Firm—Toren, McGeady, Stanger, Goldberg & Kiel

[57] ABSTRACT

An axial securing device for securing a needle bearing bush in a yoke eye of the yoke arm of a universal joint including an annular groove provided in the yoke eye having at the end thereof facing the outside of the yoke arm a conical extension increasing toward the interior and a securing ring held in the annular groove to secure the needle bearing bush within the yoke eye, the securing ring having a radial sectional configuration which is wedge-shaped tapering on both sides toward the exterior and the needle bearing bush being designed at the bottom thereof as a conical projection expanding radially outwardly, the securing ring, the conical extension of the annular groove and the conical projection of the needle bearing bush having wedge angles which correspond with each other.

1 Claim, 2 Drawing Figures

AXIAL SECURING DEVICE FOR UNIVERSAL JOINT ASSEMBLY

The present invention relates generally to universal joint assemblies and more particularly to an axial securing device for securing a needle bearing bush in the yoke eye of a yoke arm of the joint assembly. In devices of the type to which the present invention relates, the bearing bush receives a crosspiece of a joint cross member and a slotted spring-like securing ring is held in an annular groove provided in the yoke eye.

Securing rings having a wedge-shaped configuration which serve as axial securing devices are known, for example, from Seeger Handbuch für den Konstrukteur (Seeger Manual for the Designer), Rolf Hübener, 1981. These so-called Seeger-Anschütz rings described in this manual have a wedge-shaped inclination on one side with the objective being to ensure a clearance-free bearing adjustment for a ball bearing, for example.

The disadvantages of an axial securing device of the type described above is that the wedge angle is such that the axial securing device with its self-inhibiting facility is held in the associated annular groove.

It has been found that in prior art axial securing devices of the type described above, the securing ring is not suitable to permit replacement of the needle bearing bushes or joint crosses in devices where these members must be frequently dismantled.

The invention is therefore directed to provision of an axial securing device for a universal joint assembly wherein, with the largest possible axial compensating distance, it will be easy to fit and to remove the parts of the assembly.

SUMMARY OF THE INVENTION

Briefly, the present invention may be described as an axial securing device for a universal joint assembly having a yoke arm with a yoke eye and a needle bearing bush therein receiving a crosspiece of a joint cross member comprising an annular groove provided in the yoke eye, said annular groove being provided at the end facing the outside of the yoke arm with a conical extension increasing toward the interior, an outer annular zone at the bottom of said needle bearing bush designed as a conical projection expanding radially outwardly, and a securing ring held in said annular groove to secure said needle bearing bush within said yoke eye, said securing ring having a radial sectional configuration which is wedge-shaped tapering on both sides toward its exterior, said securing ring having wedge angles which correspond to associated wedge angles of said conical extension of said annular groove and of said conical projection of said needle bearing bush, the size of said wedge angles and cone angles being outside the self-inhibiting area.

The advantages of the design of an axial securing device in accordance with the invention include the fact that the joint cross can be accurately aligned relative to the axes of the two joint yoke shanks, following which the needle bearing bushes are adjusted in a clearance-free manner via the radial compensating distance of the securing rings. This ensures complete centering of the joint.

As the securing rings in the annular groove are held outside the self-inhibiting area, they can be removed without difficulty in order to enable exchange of damaged needle bearing bushes, for example.

The various features of novelty which characterize the invention are pointed out with particularity in the claims annexed to and forming a part of this disclosure. For a better understanding of the invention, its operating advantages and the specific objects attained by its use, reference should be had to the drawings and descriptive matter in which there is illustrated and described a preferred embodiment of the invention.

DETAILED DESCRIPTION OF THE PREFERRED EMBODIMENT

Figure 1:
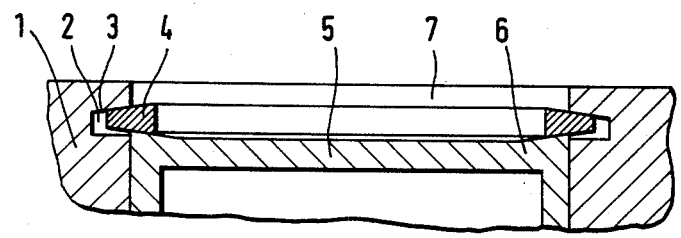
FIG. 1 is a sectional view showing a part of a joint yoke arm embodying the invention.

Referring now to the drawing, there is shown a portion of a universal joint assembly including a yoke arm 1 having a joint yoke eye 7. At the end pointing to the outer end of the yoke arm 1, there is formed an annular groove 2 which is provided with a conical extension 3. The assembly also includes a needle bearing bush 5 which, on the bottom thereof in its outer area, has been provided with an annularly extending conical projection.

The annular groove 2 contains a securing ring 4 which is formed with a wedge-shaped inclination on both sides, with one wedge face of the ring 4 resting against the conical extension 3 of the annular groove 2 and with the other wedge face of the securing ring 4 being supported against the conical projection 6 of the needle bearing bush 5.

During assembly of the joint cross (not illustrated) in the joint yokes, the cross, with the point of intersection of its two axes, is aligned relative to the axes of the two corresponding joint yokes. In this position, the needle bearing bushes 5 are fixed in the predetermined positions by means of the securing ring 4.

The invention thus ensures accurate and easy assembly of the joint.

As the securing ring 4 is held outside the self-inhibiting region at the conical extension 3 of the annular groove 1 and at the conical projection 6 of the needle bearing bush 5, dismantling of the assembly may be easily effected by utilization of appropriate tools which may be standard types of tools in the case where the needle bearing bushes or the joint cross must be replaced.

Figure 2:
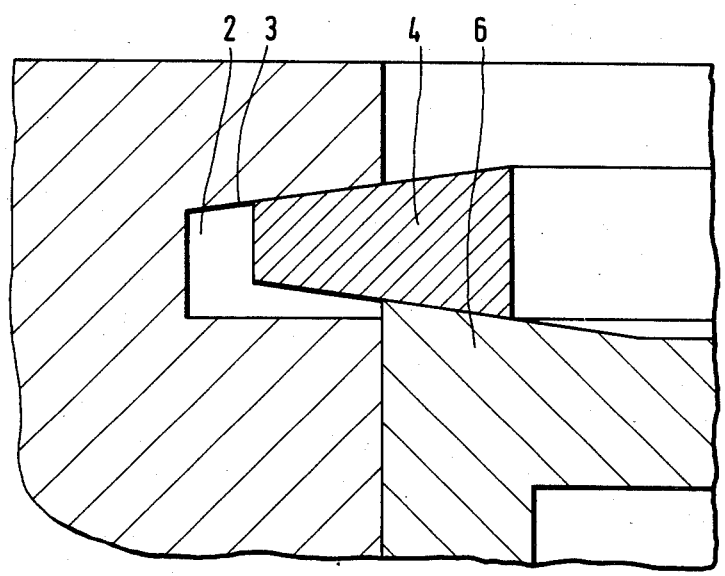
FIG. 2 is a magnified sectional view of the device shown in FIG. 1 wherein the securing ring is shown fitted in an annular groove of the joint yoke eye.

FIG. 2 shows on an enlarged scale the readjustment area which is obtained as a result of the invention.

It will thus be seen from the foregoing that the invention provides an axial securing device for securing the needle bearing bush in Cardan joints, with this axial securing device permitting, on the one hand, the largest possible axial compensating distance and being easy to fit and to remove.

It will be seen that the advantageous results of the invention are achieved in that the radial section of the securing ring, on both sides, is tapered outwardly in a wedge-shaped manner and that the securing ring, on the one hand, is supported on an extension positioned at the outside of the yoke arm and having a conical design increasing toward the inside and, on the other hand, on a conical projection arranged at the bottom of the needle bearing bush.

While a specific embodiment of the invention has been shown and described in detail to illustrate the application of the inventive principles, it will be understood that the invention may be embodied otherwise without departing from such principles.

What is claimed is:

1. An axial securing device for a universal joint assembly, comprising:

a yoke arm with an internal cylindrical wall defining a yoke eye, said yoke eye having an interior end and an exterior end taken relative to said universal joint assembly;

a needle bearing bush for receiving a crosspiece of a joint cross member arranged within said yoke eye and circumferentially surrounded by said cylindrical wall, said needle bearing bush having a bottom end wall located adjacent said exterior end of said yoke eye;

an annular groove provided in said yoke arm extending circumferentially about said yoke eye and radially outwardly from said internal cylindrical wall, said annular groove having a radially innermost end contiguous with said cylindrical wall opening into said yoke eye proximate said exterior end thereof, said groove being defined between a pair of annular walls one of which is located closer to said exterior end of said yoke eye than the other;

an annular securing ring extending circumferentially relative to said yoke eye and having a first annular wall facing toward said exterior end of said yoke eye engaged against said one annular wall of said annular groove and a second annular wall facing towards said interior end of said yoke eye engaged against said bottom end wall of said bearing bush to axially secure said bearing bush within said yoke eye and prevent movement thereof toward said exterior end of said yoke eye;

said securing ring being formed with a wedge-shaped cross sectional configuration, with said first and second annular walls thereof tapering toward a norrowing configuration radially outwardly from said yoke eye;

said one annular wall of said annular groove extending in an angular direction parallel to said first annular wall of said securing ring engaged thereagainst;

said bottom wall of said bearing bush having a conical annular portion abutting against said second annular wall of said securing ring and extending in an angular direction parallel thereto.

* * * * *